March 21, 1933. C. E. CARPENTER 1,902,058
DOUGHNUT MACHINE AND THE LIKE
Original Filed Feb. 13, 1931
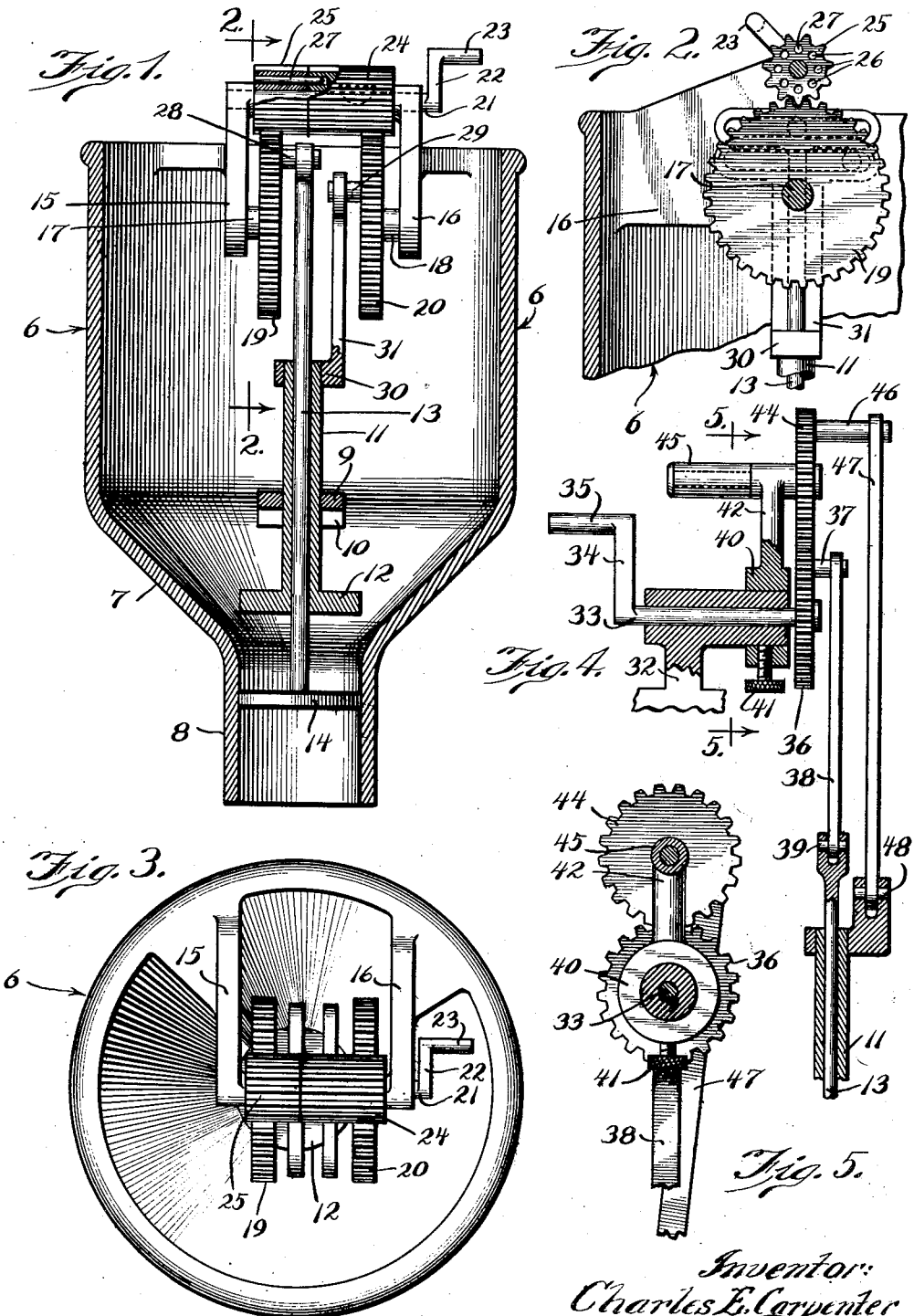

Patented Mar. 21, 1933

1,902,058

UNITED STATES PATENT OFFICE

CHARLES E. CARPENTER, OF CHICAGO, ILLINOIS

DOUGHNUT MACHINE AND THE LIKE

Application filed February 13, 1931, Serial No. 515,545. Renewed June 30, 1932.

The present invention has to do with certain improvements in machines for forming and delivering doughnuts into the frying pan or cooking vessel in which they are fried.
The invention relates particularly to improvements in the means for varying the operation of the device in such a manner that it may be regulated for the delivery of different quantities of dough material at each operation. In this way the size or bulk of the doughnuts can be regulated and adjusted within the limits of the machines.

The present devices is of that type in which use is made of a reciprocating plunger, together with a reciprocating valve, both of which work into or through a throat from which the doughnut batches are delivered. Devices of this kind have been known and used heretofore, the same being so constructed that the plunger and valve mechanisms are reciprocated in proper timed relationship with respect to each other. The present invention relates to certain improvements in the operating mechanism whereby the movements of the plunger and valve devices may be timed with respect to each other, and whereby the timing in the operation of these devices can be adjusted in a very simple manner. In this connection, it may be remarked that when the plunger and valve devices are reciprocated with a timing such that they reach their upper and lower dead centers of movement at different instants in the cycle of movements, the separation or spread between the plunger and valve devices will change during the cycle of movements, so that the space for the accommodation of the dough changes accordingly. These movements are such that when the plunger and valve devices are in the upper portion of their range of movement, they are separated substantially the maximum distance apart, the valve being in the upper portion of the throat and the plunger having travelled to a position above the throat, so that the batch or charge of dough is drawn in between them. This amount of separation is substantially maintained during the subsequent downward travel of the plunger and valve devices through the throat, carrying with it the dough batch or charge until the valve reaches a position beneath the lower end of the throat so as to open or expose said lower end of the throat for the delivery of said dough batch. At this point the valve movement is arrested, and the downward movement of the plunger continues so as to discharge the proper amount of dough from the lower end of the throat and around the valve. The amount so discharged will depend upon the reduction of space existing between the valve and plunger device during the time that the lower end of the throat is open. The upward movement of the plunger and valve devices then takes place while they are relatively close together and continues until the plunger moves out from the upper end of the throat and into the dough hopper, the valve remaining within the throat. The separation between the plunger and valve devices is increased during this portion of the movement so as to draw in a fresh charge of dough between the parts.

The variation of clearance or space between the plunger and valve devices during this cycle of movements will depend upon the relative timing of these parts. This variation would be a minimum or zero in case the parts reached their upper and lower limits of movement simultaneously. As the operating cycle of the valve is given a lead in comparison to the operating cycle of the plunger, the variation of clearance between the parts will increase according to a trigonometric function of such angular lead. This is true particularly in those cases in which the length of the strokes does not vary.

The main object of the present invention is to provide new and improved means for making it possible to vary this lead so that the adjustment of the machine may be changed from time to time according to the exact size of the doughnuts which it is desired to produce and according to the material or recipe which is being used. In this connection it is especially an object of the invention to provide arrangements such that the use of movable or shiftable cams may be eliminated since the same constitute a source of trouble and annoyance in operation, as well as being expensive to construct.

Another feature of the invention relates to the provision of an improved construction of device whereby the angular lead or movement may be adjusted in a very simple manner, even during the operation of the device and without the necessity of disconnecting or disassembling parts. In this connection, it is an object to provide a construction such that relative angular movement is adjusted by merely shifting a handle or other convenient member from one position to another.

Other objects and uses of the invention will appear from a detailed description of the same, which consists in the features of construction and combination of parts hereinafter described and claimed.

In the drawing:

Figure 1 shows a vertical central section through a machine embodying the features of the present invention, the construction therein illustrated being one in which the adjustment of the angular relationship is effected by changing the angle at which a pair of gears are connected together;

Figure 2 shows a fragmentary elevation on the line 2—2 of Figure 1, looking in the direction of the arrows;

Figure 3 shows a plan view corresponding to Figure 1;

Figure 4 shows a fragmentary vertical section through a modified form of construction; and Figure 5 shows a fragmentary transverse section on the line 5—5 of Figure 4, looking in the direction of the arrows.

Referring first to Figure 1, I have therein illustrated a dough hopper or can 6, the lower portion 7 of which is contracted or tapered in size and terminates in a downwardly extending cylindrical throat 8. A cross bracket 9 extends across the central portion of the hopper 6, its end portions being supported by or attached to brackets such as 10 on the inner face of the hopper 6.

A vertical sleeve 11, is reciprocatingly mounted in the bracket 9, the lower end of said sleeve carrying a plunger 12 which is of proper size to work nicely into the cylindrical throat 8. A rod 13 is slidably extended through a sleeve 11, the lower end of said rod carrying a valve 14. This valve is also of proper size to work nicely within the throat 8.

In the construction illustrated in Figures 1, 2, and 3, there are inwardly extending brackets 15 and 16 which reach inwardly from the upper portion of the hopper 6 and serve to support the stub shafts 17 and 18 which are journaled in said brackets. Gears 19 and 20 are carried by the inner ends of said stub shafts.

Extending across and journaled between the upper portions of the brackets 15 and 16 is a drive shaft 21 which may be turned in any convenient manner as by means of the crank 22 and crank handle 23. A gear 24 is secured to the shaft 21, preferably being keyed thereon, so that said gear always maintains a fixed angular position on said shaft. The gear 24 meshes with the gear 20.

There is another gear 25, which is freely mounted upon the shaft 21 and is therefore free to turn thereon, said gear 25 meshing with the gear 19.

The gear 25 is provided with a series of through holes 26 located at different positions around the circle of said gear, said holes being preferably formed at a uniform distance from the shaft 21. The face of the gear 24 is provided with a socket so that a tie-pin 27 passed through a selected one of the holes 26 and engaged with the socket of the gear 24 will lock the two gears together at a corresponding angular position. By withdrawing the tie-pin 27, the two gears may be turned with respect to each other so as to bring a new hole 26 into registry with the socket of the gear 24, and then said pin may be reinserted so as to lock the two gears together in the new or adjusted position. In some cases, the face of the gear 24 adjacent to the gear 25 may be provided with a series of sockets located at different positions around the circle; and in such case, it is only necessary to withdraw the tie-pin 27 sufficiently to disengage from the socket in which it was previously engaged, then turn the two gears with respect to each other to the desired position so as to register a new socket into line with the pin, and then reinsert the pin into engagement with said newly selected socket.

It will be noted that during the process of changing the relative positions of the gears 24 and 25 with respect to each other, the angular position of the gears 19 and 20 are also shifted with respect to each other, since the gears 24 and 25 are permanently meshed with the gears 20 and 19, respectively.

There are crank pins 28 and 29 reaching inwardly from the faces of the gears 19 and 20 respectively. The upper portion of the sleeve 11 carries a sleeve 30 which is provided with an upward extension 31, the upper end of which has a transversely extending slot to receive the pin 29 so that as the gear 20 rotates, the sleeve 11 is moved up and down in a rectangular movement by engagement of the pin 29 with said slot. Likewise, the upper portion of the rod 13 is laterally enlarged and carries a transversely extending slot to receive the pin 28 so that as the gear 19 rotates, the rod 13 is moved up and down with a rectangular movement.

It may be mentioned at this point that the parts are generally so arranged and proportioned that the valve 14 does not ride out of the top end of the throat 8, but does ride below the lower end of said throat. Also, it will be noted that due to the engagement of the valve 14 with the throat, and the sleeve 11 with the bracket 9, there is established a guide for the vertical reciprocations of the parts so as to cause them to travel with a straight line movement.

Referring to the modified construction shown in Figures 4 and 5, in this case the brackets 15 and 16 together with the various stub shafts and gears are eliminated. In place thereof there is provided a stationary bracket 32 within which is journaled an operating shaft 33 having a crank 34 and a crank handle 35 for operating the same. A gear 36 is secured to the inner end of the shaft 33 and a crank pin 37 reaches inwardly from the face of said gear 36. A connecting rod 38 has its upper end working on the crank pin 37 and its lower end is pinned to the upper end of the rod 13 by means of the pin 39. This arrangement takes care of the necessary lateral swings due to the rotation of the crank pin 37.

There is a collar 40 mounted upon an extension of the bracket 32 so that said collar can be turned around, and can then be locked in any given position by means of a set screw 41. A bracket 42 reaches out from the collar 40 and carries a pin 43 upon which is journaled a gear 44 which is of the same size as the gear 36 and meshes therewith. A handle 45 is connected to the bracket 42 so as to provide a simple and ready means for turning said bracket into the desired position after the set-screw 41 has been loosened up. A crank pin 46 extends inwardly from the face of the gear 44 to a position past the plane of travel of the crank pin 37; and a connecting rod 47 has its upper end working on the crank pin 46 and its lower end pinned to the upper end of the sleeve 11 by means of a pin 48. This connecting rod 47 therefore serves as a simple and direct means for converting the rotating movement of the crank pin 46 into the reciprocations of the sleeve 11.

It may be noted that the angular relation between the movements of the sleeve 11 and the rod 13 is changed by merely shifting the bracket 42 in one direction or the other by means of handle 45. This fact will be understood from the following construction.

Assuming that the shaft 33 and gear 36 are held stationary, the shifting of the bracket 42 will cause the gear 44 to rotate due to engagement with the gear 36, and this rotation will in turn change the angular relationship of the cycle of movements of the crank pin 46 with respect to the cycle of movements of the crank pin 37, thereby similarly changing the angular relation between the reciprocations of the sleeve and rod, together with the plunger and valve at their lower ends.

While I have herein shown and described only certain embodiments of the features of my present invention, still I do not intend to limit myself thereto except as I may do so in the claims.

I claim:

1. In a device of the class described, the combination with a hopper having a downwardly extending cylindrical throat together with a plunger and a valve reciprocatingly working within said throat, and an upwardly extending sleeve having its lower end connected to the plunger and an upwardly extending rod reaching through said sleeve and having its lower end connected to the valve, of means for vertically reciprocating said sleeve and rod in timed relationship and for adjusting the timing of the movement of said parts, said means comprising a gear journaled for rotation about a horizontal axis, a bracket journaled for swinging adjustment concentric with said gear, a gear journaled on said bracket and meshing with the first mentioned gear, both of said gears being of the same size, means for swinging said bracket into adjusted position, means for locking said bracket in said adjusted position, and operative connections between said gears and the sleeve and the rod respectively, substantially as described.

2. In a device of the class described, the combination with a hopper having a downwardly extending cylindrical throat together with a plunger and a valve reciprocatingly working within said throat, and an upwardly extending sleeve having its lower end connected to the plunger and an upwardly extending rod reaching through said sleeve and having its lower end connected to the valve, of means for vertically reciprocating said sleeve and rod in timed relationship and for adjusting the timing of the movement of said parts, said means comprising a gear journaled for rotation about a horizontal axis, a bracket journaled for swinging adjustment concentric with said gear, a gear journaled on said bracket and meshing with the first mentioned gear, both of said gears being of the same size, and operative connections between said gears and the sleeve and the rod respectively, substantially as described.

CHARLES E. CARPENTER.